United States Patent [19]

Waterston

[11] 3,868,962

[45] Mar. 4, 1975

[54] BACK FLOW PREVENTOR

[76] Inventor: William Waterston, 73 Kaikorai Valley Rd., Dunedin, New Zealand

[22] Filed: May 29, 1973

[21] Appl. No.: 364,242

[30] Foreign Application Priority Data
May 26, 1972 New Zealand.................. 167291/72

[52] U.S. Cl. ............................................... 137/218
[51] Int. Cl............................................ F16k 45/00
[58] Field of Search ............ 137/217, 218; 251/61.1

[56] References Cited
UNITED STATES PATENTS
3,155,107  11/1964  Woodford........................... 137/218

Primary Examiner—Henry T. Klinksiek
Attorney, Agent, or Firm—Holman & Stern

[57] ABSTRACT

This invention relates to a back flow preventor for a fluid supply line in which there is a fluid chamber, a check valve controlled inlet and a check valve controlled outlet. A relief valve is positioned radially outwardly of the inlet check valve, and a diaphragm is provided, the downstream face of which acts as the inlet check valve member and the upstream face acts as the relief valve member, a portion of the downstream face radially outwardly of the relief valve being in a relief chamber which is subject to atmospheric pressure. A pressure difference between the inlet pressure and atmospheric pressure acts on the diaphragm and the downstream fluid pressure in the chamber is applied to the downstream face of the diaphragm in said relief chamber to counter-balance this difference in pressure and prevent back flow. Should the downstream fluid pressure increase to a sufficient level above the fluid inlet pressure the diaphragm is moved to close the inlet check valve and to open the relief valve to release the excess fluid pressure.

5 Claims, 4 Drawing Figures 3,868,962

BACK FLOW PREVENTOR

BACKGROUND OF THE INVENTION

The present invention relates to devices for preventing back flow in fluid supply systems before back flow is possible.

OBJECTS AND SUMMARY OF THE INVENTION

It is one object of the invention to provide a differential pressure back flow preventor in which means are incorporated to compensate for various pressure conditions occurring therein so that back flow therethrough does not occur.

Another object of the present invention is to provide means which provide an efficient method of preventing back flow of fluids in the fluid supply systems but at the same time being of reasonable cost and efficient in operation.

Specific conditions in which the device is designed to react are, for example, where normal flow is interrupted by a sudden drop in the mains pressure or a failure of a part of the device.

According to one aspect of the present invention, a back flow preventor for incorporating in a fluid supply system comprises a fluid chamber; an inlet to the chamber; an outlet from the chamber; a relief outlet from the chamber; a spring influenced diaphragm, the upstream face of which is engageable with a non-return valve seat to close off the inlet and the downstream face of which is engageable with a relief valve seat to close off the relief outlet; the relief valve seat being situated radially outwardly of the non-return valve seat; a portion of the diaphragm situated radially outwardly of the relief valve seat being in communication on its downstream face with the atmospheric pressure; and a thrust member engageable with said portion of said diaphragm, the arrangement being such that said portion of the diaphragm upon which there acts a difference in pressure between fluid pressure from said inlet and the atmospheric pressure, is supported by said thrust member, which thrust member is arranged to transmit the downstream fluid pressure of said fluid chamber to said portion of the diaphragm to counter-balance this difference in pressure.

In order that the invention may be more readily understood, a preferred form of the invention will be described below by way of example only and with reference to the accompanying drawings in which:

DETAILED DESCRIPTION OF THE INVENTION

Figure 1:
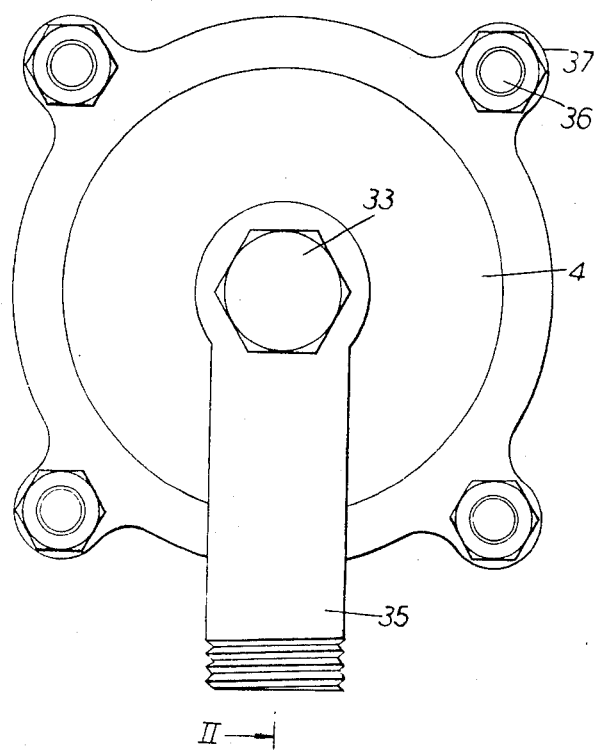
FIG. 1 is an end view of a preferred form of back flow preventor according to the present invention.
Figure 2:
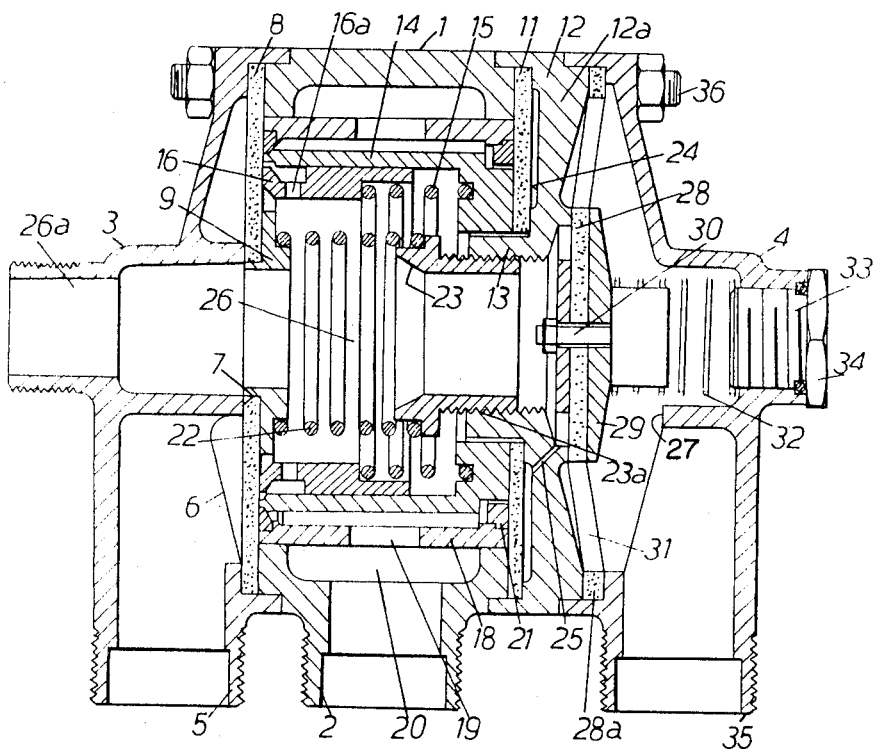
FIG. 2 is a longitudinal cross-sectional view along the line II — II of FIG. 1 with the check valves of the back flow preventor of the present invention closed.
Figures 3, 3A:
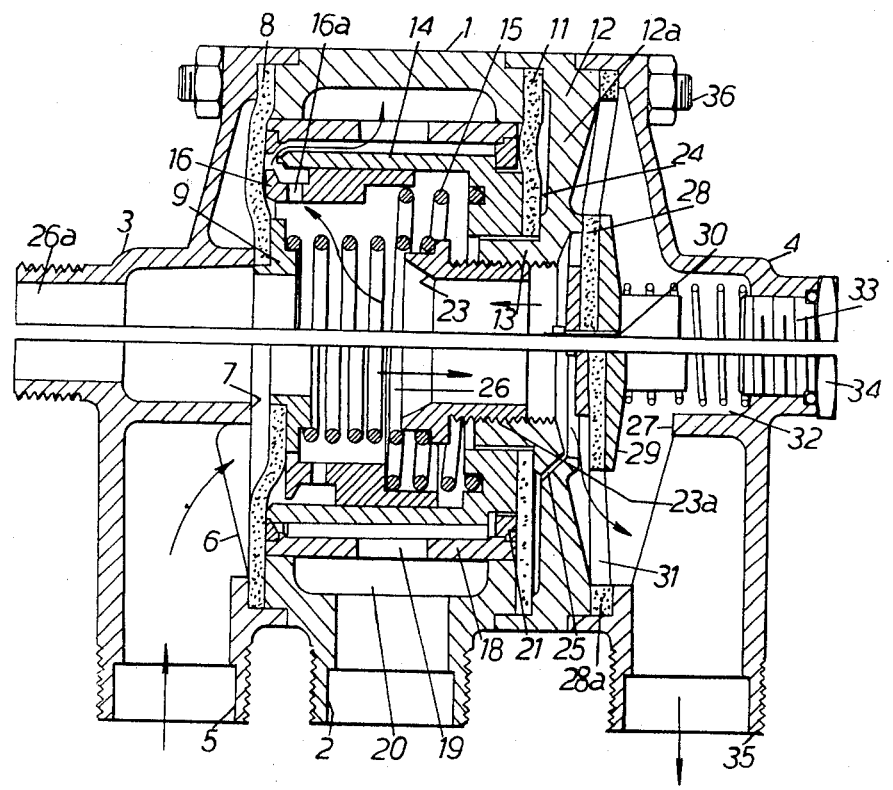
FIG. 3 is the same view as FIG. 2 of the back flow preventor, indicating the back flow condition.
FIG. 3a is a similar view showing the straight through flow condition.

According to a preferred form of the present invention shown in FIGS. 1, 2 and 3, by way of example only, the back flow preventor of the present invention is provided with a casing formed by an outer sleeve-like member 1 having a relief outlet 2 formed therein and extending from the periphery thereof as shown in the drawing.

A first end cover plate 3 is provided for engagement with one end of the sleeve-like member and a second end cover plate 4 for the other end of the preventor. The cover plate 3 has formed therein an inlet 5 leading to an annular inlet chamber 6 formed within the cover plate 3, there being a central annular non-return valve seat 7 extending co-axially of the annular inlet chamber 6. The second cover plate 4 has formed therein an outlet 35. Suitable connection means such as the screw-threading shown, for example, may be provided on inlet 5, outlet 35 and relief outlet 2 for connection to conduits or the like as required.

A first annular diaphragm 8 of suitable resilient material is mounted across the annular inlet chamber 6 and has its outer marginal portion gripped between the cover plate 3 and the one end of the sleeve-like member 1, with the inner edge portion of the annular diaphragm 8 being engageable with the annular seat 7 formed in the cover plate 3 and being attached to an annular flanged backing member 9.

A second annular diaphragm 11 is provided having its outer margin portion held between the outer end of the sleeve-like member 1 and a carrier member 12. The carrier member 12 has a transverse wall 12a extending radially inwardly of the casing and which is provided with a central sleeve-like portion 13 extending toward the inlet end of the casing. The radially inner margin of the diaphragm member 11 is gripped between the carrier member 12 and one enlarged end of an inner sleeve member 14 threaded onto portion 13. The inner sleeve member 14 extends longitudinally of the device to engage with its other end on the downstream face of the annular diaphragm 8 and form here a relief valve seat. Furthermore, the enlarged end of the inner sleeve member 14 is provided with a suitable annular recess or groove therein to accommodate one end of a coiled spring 15 extending between the sleeve member 14 and a spring guide tube member 16, which is of such external diameter as to be slidably engaged within the inner sleeve member 14 and the upstream end of which engages the downstream face of the diaphragm 8. Apertures 16a are provided in the spring guide tube 16 providing communication therethrough. The spring 15 is biased to push the diaphragm 8 from out of contact with the end of the sleeve member 14 forming the relief valve seat under certain conditions described below. A thrust tube 18 extends between the two diaphragms 8 and 11 with each of its ends engaged with one or other of the diaphragms 8, 11 and provided with at least two apertures 19 therein leading to the relief outlet 2. A relief chamber 20 is formed between the outer sleeve member 1 and the sleeve member 14 and is in communication with atmospheric pressure via the relief outlet 2 formed in the outer sleeve member 1. A thrust ring 21 is provided such that the thrust tube 18 lies radially between the thrust ring 21 and the outer sleeve member 1 and with the related inner margin of the tube 18 engaged on the complementarily shaped outer margin of ring 21. The thrust ring 21 enables the application of the pressure applied by tube 18 over a greater area of the diaphragm 11.

A further coiled spring 22 is positioned with its one end engaged on the flange of the annular backing member 9 and its other end engaged about a tubular spring adjuster 23, which adjuster is provided with a screw thread 23a thereon co-operating with a similar thread within the central sleeve portion 13 of carrier member 12, whereby the pressure exerted by the spring 22 on backing member 9 and hence on diaphragm 8 may be pre-set and adjusted.

The transverse wall 12a of carrier member 12 is furthermore so formed as to provide an annular chamber 24 on the outlet or downstream side of the diaphragm 11 which is in communication with a fluid chamber 26 of the back flow preventor by means of bores 25 provided in the wall 12a.

A further annular check valve seat 27 is provided in the carrier member 12 to seat a check valve member 28 extending across the outlet of chamber 26 and held by its marginal portion 28a between the carrier member 12 and the second end cover plate 4. The check valve member 28 is flexible and formed with a central portion held to the annular marginal portion 28a by radial legs with the fluid being allowed to flow between the radial legs through apertures 31. The central portion of valve member 28 is attached to rigid backing members 29 such as by means of a screw as shown in FIG. 2, for example, or a similar fastening means. The valve member 28 is biased to engage the seat 27 by means of a light coil spring 32 engaging a plug 33 inserted in and closing an aperture formed in the second cover plate 4, with said plug 33 being provided preferably with suitable sealing means such as an O-ring seal 34 and screwing into the aperture.

The end cover plates 3, 4 and carrier member 12 and sleeve-like member 1 of the casing are held together to assemble the back flow preventor by means of bolts 36 passing through aligned lugs 37 formed on the end cover plates 3, 4. Four such lugs 37 are shown in FIG. 1. The first end cover plate 3 is provided with an outlet 26a therein which can be closed off, preferably by a sealing cap or plug (not shown), suitably threaded therein. In use, this outlet 26a is closed off unless a test cock is to be fitted to the device and replaces the cap. The diaphragms 8 and 11 at their outer margins act as seals for the casing by virtue of the tightening together of the parts of the device.

In use, the back flow preventor shown in the drawings is connected into a fluid supply system such as a mains water supply for example, with the inlet 5 and the outlet 35 connected into a conduit (not shown) in the supply system. With the fluid flowing from the supply its passage or normal flow (indicated in the full arrows in the lower half of FIG. 3) passes through the inlet 5 into the annular chamber 6 where it pressurizes the upstream face of the first diaphragm 8 which is held on the non-return valve seat 7 against this fluid inlet pressure by the spring 22. Directly this fluid pressure exceeds the spring pressure applied by spring 22, the diaphragm 8 lifts from the seat 7 to allow the water to enter the fluid chamber 26, with the pressure in this chamber (the downstream pressure) being normally maintained at a lower pressure than the inlet pressure due to the influence of the spring 22. The downstream fluid pressure in the fluid chamber 26 acts on the upstream face of the check valve member 28 and on the backing members 29 against the light spring 32 to displace the member 28 away from the check valve seat 27 and allow flow of the fluid through the apertures 31 in the valve member 28 and into the outlet 35.

Not only does the downstream pressure in the central chamber 26 act on the valve member 28 but acts through the bores 25 and chamber 24 on one face of the diaphragm 11, with the pressure on the other face of the diaphragm 11 being that of atmosphere through the relief port 2 and the relief chamber 20 associated therewith. Furthermore, the lower downstream pressure in fluid chamber 26 acts on the downstream face of the diaphragm 8 radially inwardly of sleeve member 14 through the communicating passageways provided between the backing member 9 and the spring adjuster 23 and through the apertures 16a. The portion of the diaphragm radially outward of member 14 is subjected to atmospheric pressure through relief chamber 20.

Because of the pressure differential across the diaphragm 8, the downstream face of diaphragm 8 effects a seal against the end face of the inner sleeve member 14 (relief valve seat) overcoming the opening effect of the spring 15 acting on member 16.

The downstream pressure in the fluid chamber 26 acts via the bores 25 on the one side of diaphragm 11 and transmits this effect through the thrust tube 18 to the downstream face of the diaphragm 8 thereby nullifying the effect of the atmosphere in chamber 20.

The moment the flow of liquid to the inlet 5 is cut-off or stopped both members 8 and 28 close against their respective check valve seats 7,27 as shown in FIG. 2, by virtue of the spring pressures of springs 22 and 32 respectively, giving a double check valve effect to prevent backflow. The pressure in chamber 26 is maintained at the lower pressure established by the spring 22.

The back flow preventor is designed to accommodate a certain amount of fluctuation in the mains pressure.

Should the mains pressure start dropping below the designed maximum allowable pressure drop, for example, such as occurring when the taps are all turned off and no water is being used, then directly the mains pressure starts dropping, the pressure differential between the inlet 5 and fluid chamber 26 decreases and the downstream pressure in the chamber 26 assisted by the influence of the spring 15 acting on the spring guide 16 folds back the diaphragm 8 between check valve seat 7 and its outer margin and as the mains pressure continues to drop, the diaphragm 8 is sufficiently folded back to open from the relief valve seat at the end face of sleeve member 14 and allow flow from chamber 26 around the end of member 14 and through aperture 19 into relief chamber 20 and the relief outlet 2 to drain. This occurs until the lower downstream pressure in chamber 26 reaches its normal pressure in relation to the mains pressure because of the influence of the spring 15, and the diaphragm 11 and therefore all attempts at backflow are foiled or counterbalanced by the relief valve effect produced by the downstream face of diaphragm 8 acting on the one end of member 14 opening and thus releasing the pressure before back flow conditions are possible.

The diaphragm 8 has a non-return check valve seat 7 on the upstream face and a relief valve seat against member 14 on the downstream face. It is relatively freely moving on the seat 7 and is acted upon by the influence of fluid pressures and springs, however, it is so arranged that both seats cannot be open at the same time and the diaphragm just rests on the two seats such that where there is the lower pressure at one seat than the other, the diaphragm will close against the seat of lower pressure and move away from the seat of higher pressure. If there is a lower pressure on the upstream face of the diaphragm 8 than in the fluid chamber 26, then diaphragm 8 will be free to move of its own accord without any influence. The main spring 22 is, for example, preferably arranged to close the diaphragm 8 against the seat 7 at a pressure 10 lbs below the inlet pressure and the relief valve seat is arranged to open preferably approximately 3 lbs before the downstream pressure in fluid chamber 26 equals the mains pressure, so that the valve opens before back flow conditions have occurred.

In actual practice, the check valve effect formed by the diaphragm 28 and seat 27 stops any flow of water from the outlet back into the chamber 26 and only discharges water from the chamber 26.

Should the mains pressure fail completely, then the chamber 26 will drain completely through relief outlet 2 and the relief seat on member 14 will be held open by the spring 15. This creates a safe air gap between the higher pressure on the outlet side of diaphragm 28 and the low fluid inlet pressure on the inlet side of diaphragm 8.

With malfunction of the valve such as dirt under the seating 7 and leakage through diaphragm 8, the pressure in chamber 26 will rise and be drained off through relief outlet 2, which will be indicated by a relatively slow flow from the outlet 2.

Breakage of the spring 22 will cause a very rapid flow from the relief outlet 2 as will severe rupturing of diaphragm 8.

If there is a leakage during both flow and no-flow conditions of the system, it will be due to leakage across the relief seat or damage to the outer area of diaphragms 8 or 11.

The inlet and outlet of the device may be protected by filter sections (not shown) inserted therein of mesh or the like. The casing and parts of the device other than the diaphragms may be of metal such as stainless steel, bronze or other suitable material and the diaphragms likewise of suitable metal or rubber or any suitable elastomer or other suitable resilient material.

It will be appreciated that although the invention has been particularly described in the preferred form by way of example only, it is to be understood that the invention is not limited thereto and modifications may be made without departing from the scope of the invention as set forth in the appended claims.

I claim:

1. A back flow preventor which comprises a casing defining a fluid chamber therein; means defining an inlet to said chamber; means defining an outlet from said chamber; means defining a relief outlet from said chamber between said inlet and said outlet; means defining a relief chamber in communication with atmospheric pressure, a first annular diaphragm mounted in said chamber between said inlet and said relief outlet; means defining an annular non-return valve seat on the upstream side of said first annular diaphragm; means defining an annular relief valve seat on the downstream side of said first annular diaphragm, said relief valve seat being situated co-axially and radially outwardly of said non-return valve seat; an annular portion of said first annular diaphragm situated co-axially and radially outwardly of said relief valve seat being in communication on its downstream face with said relief chamber; a thrust member provided within said relief chamber being in contact with an annular portion of said first annular diaphragm radially outwardly of said relief valve seat, the arrangement being such that said annular portion of the first annular diaphragm radially outwardly of the relief valve seat, upon which there acts a difference in pressure between a fluid pressure from said inlet and the atmospheric pressure, is supported by said thrust member, which thrust member is arranged to transmit the downstream fluid pressure to said annular portion to counter-balance this difference in pressure.

2. A back flow preventor which comprises a casing defining a fluid chamber therein; means defining an inlet to said chamber; means defining an outlet from said chamber; means defining a relief outlet from said chamber between said inlet and said outlet, means defining a relief chamber in communication with atmospheric pressure; a first annular diaphragm mounted in said chamber between said inlet and said relief outlet; means defining an annular non-return valve seat on the upstream side of the first annular diaphragm; means defining an annular relief valve seat on the downstream side of said first annular diaphragm, said relief valve seat being situated co-axially and radially outwardly of said non-return valve seat; an annular portion of said first annular diaphragm situated co-axially and radially outwardly of said relief valve seat being in communication on its downstream face with the relief chamber; a thrust member provided within said relief chamber and being in contact with the downstream face of said annular portion of said first annular diaphragm radially outwardly of said relief valve seat; a second annular diaphragm mounted in said casing and being in communication with said downstream pressure in said fluid chamber; said thrust member being in contact with said second annular diaphragm and extending between said annular diaphragms and being movable therewith, the arrangement being such that the portion of the first annular diaphragm radially outwardly of the relief valve seat upon which there acts a difference in pressure between the inlet fluid pressure and the atmospheric pressure is supported by said thrust member, which thrust member transmits the downstream fluid pressure to said annular portion via said second annular diaphragm to counter-balance this difference in pressure.

3. A back flow preventor which comprises a casing defining a fluid chamber therein; means defining an inlet to said chamber; means defining an outlet from said chamber; means defining a relief outlet from said chamber between said inlet and said outlet; a first annular diaphragm mounted in said chamber between said inlet and said relief outlet; means defining an annular non-return valve seat on the upstream side of said first annular diaphragm; a sleeve member mounted co-axially of the non-return valve seat having its one end face engageable with the downstream face of the first annular diaphragm to form a relief valve seat, said relief valve seat being situated radially outwardly of said non-return valve seat; means defining an annular relief chamber radially outwardly of said sleeve member; the upstream face of an annular portion of said first annular diaphragm being in communication on its downstream face with said relief chamber and positioned radially outwardly of said sleeve member; said relief chamber being in communication with atmospheric pressure; a tubular thrust member provided within said relief chamber; a second annular diaphragm mounted in said casing and having one face in communication with said relief chamber and its other face in communication with the downstream fluid pressure; said tubular thrust member having its one end in contact with said annular portion of the first annular diaphragm and its other end in contact with said annular diaphragm and extending between said diaphragms and being movable therewith; means being provided within said fluid chamber enabling communication between said fluid chamber and an annular portion of said downstream face of the first annular diaphragm radially inwardly of said sleeve member; a further tubular member mounted radially inwardly of said sleeve member and slidably longitudinally relative thereto by spring influence to provide a thrust surface acting on the downstream face of the annular diaphragm; the arrangement being such that said annular portion of the diaphragm radially outwardly of the relief valve seat, upon which there acts a difference in pressure between the inlet fluid pressure and the atmospheric pressure, is supported by said thrust member which transmits the downstream fluid pressure to said annular portion via said second diaphragm to counter-balance the difference in pressure, the downstream fluid pressure within said fluid chamber together with said further spring-influenced tubular member acting to open the first annular diaphragm from the relief valve seat when the downstream fluid pressure exceeds said difference in pressure.

4. A back flow preventor which comprises a casing defining a fluid chamber therein; means defining an inlet to the chamber; means defining an outlet from said chamber; means defining a relief outlet from said chamber between said inlet and said outlet; means defining a relief chamber in communication with atmospheric pressure; a first annular diaphragm mounted in said chamber between said inlet and said relief outlet; means defining an annular non-return valve seat on the upstream side of said first annular diaphragm; means defining an annular relief valve seat on the downstream side of said first annular diaphragm, said relief valve seat being situated co-axially and radially outwardly of said non-return valve seat; an annular portion of said first annular diaphragm situated co-axially and radially outwardly of said relief valve seat being in communication on its downstream face with said relief chamber; a thrust member provided within said relief chamber being in contact with said annular portion of said first annular diaphragm; means enabling adjustment of the downstream fluid pressure in said fluid chamber and comprising an adjustable spring means engageable with the downstream face of the first annular diaphragm; the arrangement being such that said annular portion of the first annular diaphragm radially outwardly of the relief valve seat upon which there acts a difference in pressure between the inlet fluid pressure and the atmospheric pressure, is supported by said thrust member, which thrust member is arranged to transmit the downstream fluid pressure to said annular portion to counter-balance this difference in pressure.

5. A back flow preventor which comprises a casing defining a fluid chamber therein; means defining an inlet to said chamber; means defining an outlet from said chamber; means defining a relief outlet from said chamber between said inlet and said outlet; means defining a relief chamber in communication with atmospheric pressure; a first annular diaphragm member mounted in said chamber between said inlet and said relief outlet; means defining an annular non-return valve seat on the upstream side of said first annular diaphragm; means defining an annular relief valve seat on the downstream side of said first annular diaphragm, said relief valve seat being situated co-axially and radially outwardly of said non-return valve seat; an annular portion of said first annular diaphragm situated co-axially and radially outwardly of said relief valve seat being in communication on its downstream face with said relief chamber; a thrust member provided within said relief chamber being in contact with said annular portion of said first annular diaphragm, a spring influenced check valve engageable with said outlet to close off said outlet in conditions of no flow; the arrangement being such that said annular portion of the first annular diaphragm radially outwardly of the relief valve seat upon which there acts a difference in pressure between the inlet fluid pressure and the atmospheric pressure is supported by said backing member, which backing member is arranged to transmit the downstream fluid pressure to said annular portion to counter-balance this difference in pressure.

* * * * *